United States Patent [19]

Adams

[11] Patent Number: 4,729,590
[45] Date of Patent: Mar. 8, 1988

[54] VISOR ROD MOUNT

[75] Inventor: Edward R. Adams, Spring Lake, Mich.

[73] Assignee: Prince Corporation, Holland, Mich.

[21] Appl. No.: 28,781

[22] Filed: Mar. 23, 1987

[51] Int. Cl.⁴ ................................................. E04G 3/00
[52] U.S. Cl. ............................. 296/97 K; 296/97 R; 248/289.1
[58] Field of Search ............... 296/97 R, 97 H, 97 J, 296/97 K; 248/289.1, 222.1, 222.3

[56] References Cited

U.S. PATENT DOCUMENTS

| | | | |
|---|---|---|---|
| 2,084,584 | 6/1937 | Jacobs | 296/97 R |
| 2,110,120 | 3/1938 | Ball | 296/97 R |
| 2,357,974 | 9/1944 | Roberts | 248/289.1 |
| 2,939,741 | 6/1960 | Keating et al. | 296/97 R |
| 3,017,217 | 1/1962 | Keating | 296/97 K |
| 3,150,896 | 9/1964 | Plattner | 296/97 R |
| 3,399,923 | 9/1968 | Bornefeld et al. | 296/97 R |
| 3,477,678 | 11/1969 | Icke et al. | 248/288 |
| 3,767,256 | 10/1973 | Sarkees | 296/97 K |
| 4,023,856 | 5/1977 | DeRees | 296/97 R |
| 4,148,519 | 4/1979 | Hollar, Jr. | 296/97 H |
| 4,178,035 | 12/1979 | Cziptschirsch | 296/97 K |
| 4,352,518 | 10/1982 | Prince et al. | 296/97 H |
| 4,377,020 | 3/1983 | Vigo | 16/329 |
| 4,525,008 | 6/1985 | Foggini | 296/97 K |
| 4,529,157 | 7/1985 | Suman et al. | 296/97 K |
| 4,553,797 | 11/1985 | Marcus | 339/22 |
| 4,569,552 | 2/1986 | Marks | 296/97 K |
| 4,634,196 | 1/1987 | Nestell | 339/5 R |
| 4,653,708 | 3/1987 | Rich | 248/222.3 |

FOREIGN PATENT DOCUMENTS

| | | |
|---|---|---|
| 1965143 | 7/1970 | Fed. Rep. of Germany . |
| 7415154 | 8/1974 | Fed. Rep. of Germany . |
| 7531982 | 2/1976 | Fed. Rep. of Germany . |
| 2341940 | 6/1978 | Fed. Rep. of Germany . |
| 1251479 | 10/1971 | United Kingdom . |

Primary Examiner—Robert B. Reeves
Assistant Examiner—Russell D. Stormer
Attorney, Agent, or Firm—Price, Heneveld, Cooper, DeWitt & Litton

[57] ABSTRACT

A preassembled visor rod mount includes a bezel and a clamping ring rotatably movable with respect to the bezel to lock the mount in position once fitted within a socket formed in the roof. In the preferred embodiment of the invention, the spaced tangs on the rotatable clamping ring include upwardly bent ends to cam the deflectable tangs over the roof edges. A pair of arcuate slots are provided through the bezel and a spanner wrench can be employed to extend through the bezel and engage apertures formed in the clamping ring for its rotation with respect to the bezel.

21 Claims, 6 Drawing Figures

U.S. Patent  Mar. 8, 1988  4,729,590
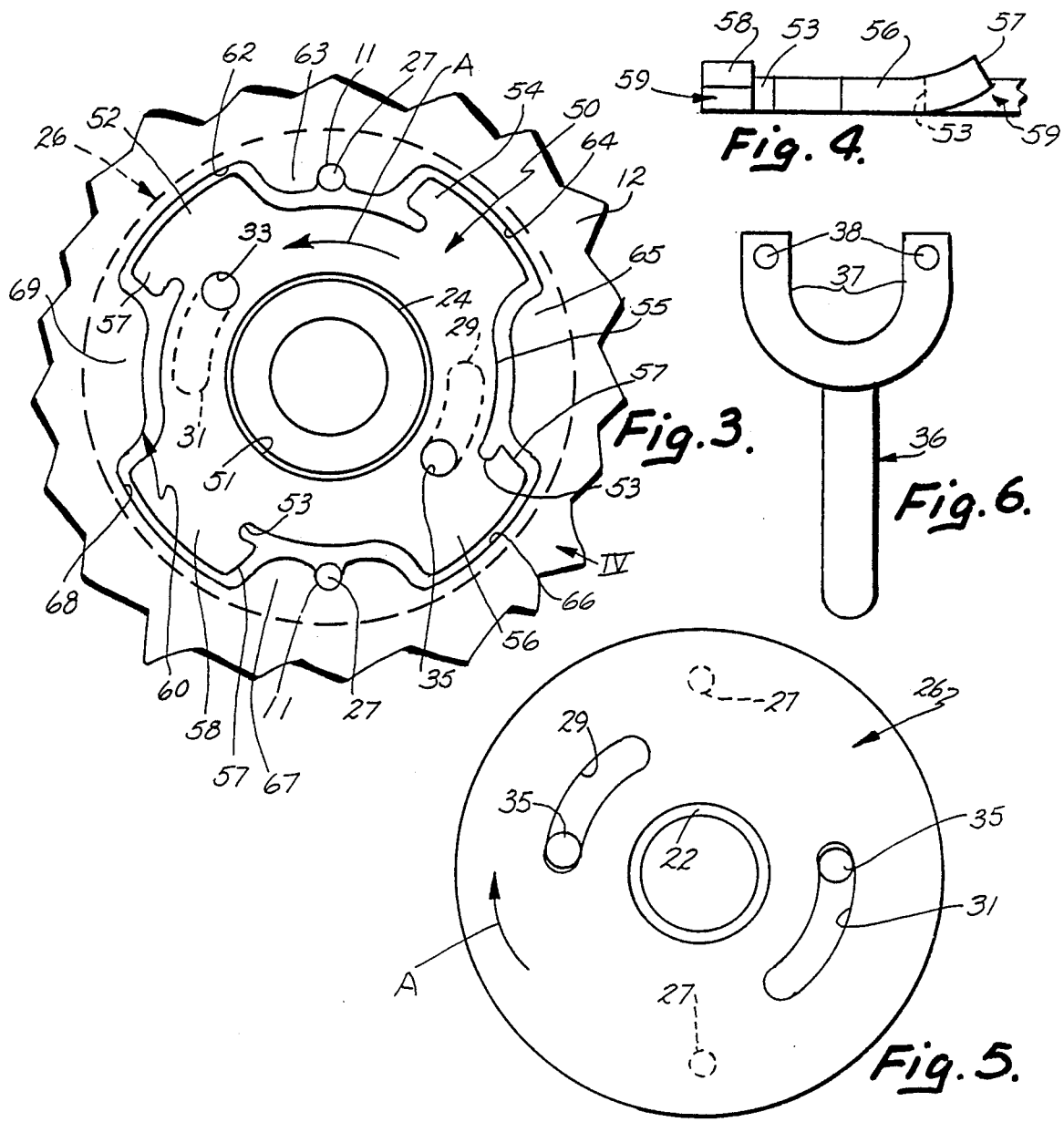

VISOR ROD MOUNT

BACKGROUND OF THE PRESENT INVENTION

The present invention relates to vehicle sun visors and particularly to a mounting system for installing a visor to a vehicle.

Vehicle visors are typically mounted in the headliner of a vehicle and secured to the underlying sheet metal roof by an elbow bracket which permits the visor to be moved from a forward windshield position to the side window depending upon the position of the sun with respect to the vehicle. The elbow assembly is mounted to the vehicle roof usually by three screws as shown in U.S. Pat. No. 4,227,241.

There has been several proposals for providing snap-in visor mounts which are illustrated for example in U.S. Pat. Nos. 2,357,974; 4,178,035; 4,377,020; and 4,569,552. Great Britain Pat. No. 1,251,479 discloses a visor mounting structure in which a socket is secured within an aperture of the vehicle roof, and a plug with tabs is inserted and lockably held within the socket through L-shaped slots and a compression spring mounting arrangement. Additionally, U.S. Pat. No. 4,529,157 discloses a pivot mount for a visor rod which includes a pair of mounting members which compressably engage inwardly projecting tabs of a sheet metal roof using a fastening screw.

SUMMARY OF THE PRESENT INVENTION

The system of the present invention provides a preassembled visor rod pivot mount which can be lockably positioned within a socket formed in the roof of a vehicle. The structure includes a bezel and a clamping member rotatably movable with respect to the bezel and which is rotated to lock the mount in position once fitted within the socket formed in the roof. In the preferred embodiment of the invention, the socket formed in the roof includes a plurality of angularly spaced slots which receive similarly spaced tangs on the rotatable clamping member which once positioned within the socket extend on a side of the roof opposite the bezel. When rotated the deflectable tangs of the clamping member provide a clamping force clamping the roof segments between a flange of the bezel and clamping member tangs for holding the visor in position on the vehicle roof. For purposes of rotating the clamping member once positioned within the roof's socket, a pair of arcuate slots are provided through the bezel and a spanner wrench can be employed to extend through the bezel and engage apertures formed in the clamping member for its rotation with respect to the bezel. In a preferred embodiment of the invention, the bezel includes at least one pin means for indexing the bezel with respect to the roof to prevent its rotation during installation and use of the visor.

The system of the present invention thereby provides a preassembled visor rod mount which relatively easily fits within a configurated aperture formed in a roof of a vehicle and which can be quickly installed by the twist of a clamping member. Such construction facilitates the installation of the visor assembly during manufacturing of the vehicle as well as facilitates its removal if necessary for repair or replacement. These and other features, objects and advantages of the present invention will become apparent upon reading the following description thereof together with reference to the accompanying drawings in which:

BRIEF DESCRIPTION OF THE DRAWING

FIG. 1 is a fragmentary vertical cross-sectional view partly in block form of a visor installed in a vehicle by a visor pivot rod mount of the present invention;

FIG. 2 is an enlarged vertical cross-section of the pivot rod mount assembly;

FIG. 3 is a top plan view of the structure shown in FIG. 1 shown with the visor rod deleted for purposes of clarity;

FIG. 4 is a fragmentary side elevational view of a portion of the clamping member shown in FIGS. 1–3 taken in the direction of arrow IV in FIG. 3;

FIG. 5 is a bottom plan view of the structure shown in FIG. 3; and

FIG. 6 is a plan view of a spanner tool employed for installation of the visor rod mount embodying the present invention.

DETAILED DESCRIPTION OF THE PREFERRED EMBODIMENT

Referring initially to FIG. 1 there as shown in block form, a visor 10 which is of the type in widespread commercial use such as the illuminated vanity mirror visor illustrated in U.S. Pat. No. 4,227,241. The visor 10 is coupled to a pivot rod 14 by an internal torque device which can be of the type described in U.S. Pat. No. 4,500,131 for movement between a raised stored position against a vehicle roof 12 and a lowered use position adjacent the windshield or pivoted to the side window by the rotation of the vertical end 15 of the angle pivot rod 14 which pivots within the visor rod pivot mount assembly 20. The end 15 of pivot rod 14 inoludes a molded-on conically tapered torque member 16 which surrounds and is fixedly secured to rod end 15. A keyway (not shown) extending along a section of rod end 15 prevents rotation of rod end 1 with respect to molded-on torque member 16. Member 16 has a conical outer surface 17 which mates with the inner conically tapered surface 22 of a collar 24 forming an integral part of the mount 20. These tapered surfaces are securely held together by means of a spring thrust washer 18 which is force fitted by a spinning process over the end 15 of visor rod 14 for holding the visor rod and torque fitting 16 within the conical socket formed by the collar 24. The visor 10 can, thus, rotate with respect to mount 20 with a predetermined frictional torque determined by the friction at interface surface 22 such that the visor can be pivoted between the windshield and side window of a vehicle.

The visor mount 20 includes a bezel 26 integrally molded with collar 24, a clamping member such as clamping ring 50 extended over collar 24, and a retainer ring 32 for holding the collar 24 in axially fixed relationship to bezel 26 while allowing rotation of the ring. The bezel is somewhat cup-shaped as seen in FIG. 1 and includes an upwardly extending circular edge defining an annular surface or flange 28 which is radially spaced from collar 24. Extending upwardly from the bezel are a pair of opposed integral locating or indexing pins 27 which nest within notches 11 formed in the roof 12 (FIG. 3) for preventing rotation of the bezel 26 with respect to the roof 12. The annular flange 28, as best seen in FIG. 1, engages the lower surface of roof 12 surrounding aperture 60 therein. The roof 12 is typically sheet metal which typically is covered with a foam padded upholstery material. Axially spaced from the flange 28 and formed in collar 24 is an annular recess 30 for receiving a snap ring 32 which holds the steel clamping member 50 against an annular shoulder 34 (FIG. 1) of the collar 24 of bezel 26 in axially spaced relationship with respect to flange 28.

The clamping member or ring 50 is generally annular in shape, as best seen in FIG. 3, and includes a central aperture 51 which extends over the outer diameter of cylindrical collar 24 as best seen in FIG. 2. The spring steel clamping ring 50 includes a plurality of equally angularly spaced tangs 52, 54, 56 and 58 which extend radially outwardly from the circular edge 55 of the body of member 50. Each of the tangs includes as best seen in FIG. 4 an upwardly curved end 57 defining a space 59. To add deflectability to the ends 57 of each of the tangs, the tangs are each undercut slightly at 53. The outer edges of each of the tangs are bent downwardly and then upwardly from the body of clamp 50 as best seen in FIGS. 1 and 2 such that in their undeformed position as seen in FIG. 2, the lower surface 61 of each of the tangs 52, 54, 56, and 58 engages the surface of flange 28 of the bezel 26. The ends 57 are curved upwardly a distance to allow each of the tangs to be cammed over an associated flange of the roof 12 as the ring 50 is rotated as described below.

In order to receive the clamping ring 50 and lock the visor pivot mount assembly 20 and visor 10 thereon to the vehicle sheet metal roof 12, the roof 12 includes a configurated aperture 60 (FIG. 3) which includes, in the preferred embodiment, four equally spaced arcuate segment shaped notches 62, 64, 66 and 68 corresponding to and aligned with tangs 52, 54, 56 and 58, respectively but slightly larger as seen in FIG. 3 to provide clearance for the initial insertion of the clamping ring 50. The remainder of aperture 60 includes four inwardly projecting angularly spaced flanges 63, 65, 67 and 69 which as seen in FIG. 1, once the pivot rod mounting structure is installed, are clamped between the tangs of ring 50 and the flange 28 of bezel 26. Aperture 60 also includes opposed pin receiving notches 11. As seen in FIGS. 3 and 4, the upwardly projecting edges 57 provide a gap 59 for each of the tangs such that when the clamping ring 50 is rotated in a direction indicated by arrow A in FIG. 3, the spring metal tangs are cammed upwardly as the edge 57 engages the roof and will deflect to ride over the flanges 63, 65, 67 and 69 to clamp the mount to the roof.

In order to facilitate the rotation of the clamping ring 50 with respect to bezel 26 and the roof 12, bezel 26 includes a pair of arcuate slots 29 and 31 which provide access to a pair of circular apertures 33 and 35 (FIGS. 3 and 5) formed on clamping ring 50 and which are radially spaced from the center of rotation of the mount to align with slots 29 and 31. Installation of the visor rod mounting assembly 20 is achieved by initially installing the visor 10 on the mount 20 by inserting the rod end 15 and torque device 16 thereon within the conically tapered bore 22 of the mount and fitting the spring 18 thereover to mount these two structures. The clamping ring is then installed over collar 24 and snap ring 32 fitted in groove 30 to hold the clamping ring in position. The assembly is then inserted into aperture 60 preformed in the roof 1 of the vehicle in a position illustrated in FIG. 3 with the alignment pins 27 of bezel 26 extending into notches 11 formed in flanges 63 and 67 to hold the bezel 26 in position with respect to the roof 12. In this position the tangs 52, 54, 56 and 58 align in slots 62, 64, 66 and 68 as seen in FIG. 3 and the apertures 33 and 35 are aligned at one end of each of the arcuate slots 29 and 31 of the bezel. A spanner wrench 36 (FIG. 6) having a pair of tines 37 spaced to position lugs 38 in alignment with apertures 33 and 35 is then inserted through the slots 29, 31 of the bezel 26 such that lugs 38 engage apertures 33 and 35 of plate 50. Plate or ring 50 is then rotated using the spanner wrench 36 in a direction indicated by arrow A in FIGS. 3 and 5. As noted above, the snap ring 30 allows the plate 50 to rotate around the shoulder 34 of collar 24 of the bezel with slots 59 camming the deflectable tangs of the spring metal clamp 50 upwardly over the leading edges of the corresponding flanges 63, 65, 67 and 69. The plate 50 is rotated in a direction indicated by arrow A approximately 45° until the lugs 38 of the spanner wrench reach the edge of slots 29, 31 opposite the initial position which corresponds to the alignment of the tangs over the lands and the clamping of the edges of aperture 60 between ring 50 and bezel flange 28. Thus, the arcuate length or span of slots 29 and 31 are selected to align the tangs of ring 50 over the flanges of the roof aperture 60. In the preferred embodiment of the invention, the spring steel plate or ring 50 had a thickness of 0.060 inches while the bezel 26 was integrally molded of a suitable aluminum alloy. Bezel 26 could also be molded of a polycarbonate material if desired.

The construction of the visor mount thereby facilitates the quick installation of the visor assembly during the vehicle manufacture and further facilitates if necessary, the removal of the visor assembly by reversing the rotating of clamp ring 50 using the spanner wrench 36 if necessary for replacement or repair. It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows:

1. A visor mount for attaching a visor to a roof member of a vehicle comprising:
   mounting means for mounting a visor rod and visor thereon to a vehicle roof, said mounting means including a bezel having a flange which abuts against the lower side of the roof and a generally cylindrical collar extending from said bezel and having a length sufficient to extend through a slotted aperture formed in the roof for receiving the end of the visor rod;
   a clamping ring and means for mounting said ring over said collar for rotation with respect to said flange and restrained from axial movement away from said flange, said clamping ring including tang means extending outwardly therefrom for insertion into the slotted aperture formed in the roof member of a vehicle and for engaging an upper side of the roof member when rotated after insertion; and
   means for rotating said clamping ring with respect to said bezel flange to compressably clamp the roof member between said tang means and said flange for securing a visor to the vehicle.

2. The apparatus as defined in claim 1 wherein said means for rotating said clamping ring comprises aperture means extending through said ring for receiving a tool and slot means formed through said bezel and aligned with said aperture means for permitting a tool to be inserted into said aperture means for rotation of said clamping ring.

3. The apparatus as defined in claim 2 wherein said slot means comprises an arcuate slot having a span selected to allow rotation of said ring a distance for aligning said tangs with respect to the slotted aperture.

4. The apparatus as defined in claim 3 wherein said aperture means comprises a pair of apertures and said slot means comprises a pair of arcuate slots aligned with said apertures.

5. The apparatus as defined in claim 4 wherein said means for mounting said clamping ring to said collar includes a recess formed in said collar in axially spaced relationship to said flange and a retainer member fitted within said recess.

6. The apparatus as defined in claim 5 wherein said retainer member comprises a snap ring.

7. The apparatus as defined in claim 6 wherein said collar has a tapered central aperture for receiving a tapered torque fitting associated with the visor rod.

8. The apparatus as defined in claim 1 wherein said bezel includes means for preventing rotation of said bezel with respect to the vehicle roof.

9. The apparatus as defined in claim 8 wherein said preventing means comprises a pair of spaced index pins extending from said bezel into aligned apertures in the roof of the vehicle.

10. The apparatus as defined in claim 1 wherein each of said tang means of said clamping ring includes an upwardly curved end for camming said tang means over the roof as the said ring is rotated.

11. The apparatus as defined in claim 10 wherein said clamping ring is made of spring steel such that said tangs are deflectable.

12. A visor and mount for attaching the visor to a roof member of a vehicle comprising:

a visor including a visor mounting rod extending therefrom;

means for mounting said rod and visor thereon to the vehicle roof, said mounting means including a bezel having a flange which abuts against the lower side of the roof member and a cylindrical collar extending from said bezel and having a length sufficient to extend through a slotted aperture formed in the roof member;

a clamping ring and means for mounting said ring over said collar for rotation with respect to said flange and restrained from axial movement away from said flange, said clamping ring including deflectable tang means extending outwardly therefrom for insertion into the slotted aperture formed in the roof member of a vehicle and for engaging an upper side of the roof member when rotated after insertion; and means for rotating said clamping ring with respect to said bezel flange to compressably clamp the roof member between said tang means and said flange for securing said visor to the vehicle.

13. The apparatus as defined in claim 12 wherein each of said tang means of said clamping ring includes an upwardly curved end for camming said tang means over the roof as the said ring is rotated.

14. The apparatus as defined in claim 13 wherein said clamping ring is made of spring steel such that said tangs are deflectable.

15. The apparatus as defined in claim 14 wherein said means for rotating said clamping ring comprises aperture means extending through said ring for receiving a tool and slot means formed through said bezel and aligned with said aperture means for permitting a tool to be inserted into said aperture means for rotation of said clamping ring.

16. The apparatus as defined in claim 15 wherein said slot means comprises an arcuate slot having a span selected to allow rotation of said ring a distance for aligning said tangs with respect to the slotted aperture.

17. The apparatus as defined in claim 16 wherein said aperture means comprises a pair of apertures and said slot means comprises a pair of arcuate slots aligned with said apertures.

18. The apparatus as defined in claim 17 wherein said means for mounting said clamping ring to said collar includes a recess formed in said collar in axially spaced relationship to said flange and a retainer member fitted within said recess.

19. The apparatus as defined in claim 18 wherein said retainer member comprises a snap ring.

20. The apparatus as defined in claim 19 wherein said bezel includes means for preventing rotation of said bezel with respect to the vehicle roof.

21. The apparatus as defined in claim 20 wherein said preventing means comprises a pair of spaced index pins extending from said bezel into aligned apertures in the roof of the vehicle.

* * * * *